Inventors:
Samuel Levy,
Hugh Winn,
by Alfred B Levine
Their Attorney.

United States Patent Office 2,937,597
Patented May 24, 1960

2,937,597

MISSILE NOSE STRUCTURE

Hugh Winn, Berwyn, and Samuel Levy, Bala Cynwyd, Pa., assignors to General Electric Company, a corporation of New York Filed Aug. 27, 1956, Ser. No. 606,946

3 Claims. (Cl. 102—92.5)

This invention generally relates to structures for withstanding extreme changes in temperature and pressures, and more particularly to such structures finding particular applicability to the forward nose portion of high speed vehicles, such as missiles.

The surface or skin portions of such aircraft bodies are rapidly subjected to extreme heat and great pressures when reentering the earth's atmosphere from outer space due to the considerable friction and other forces acting upon a body entering a fluid medium at great speeds. If this outer skin is rigidly fastened to an inner supporting structure, as in lower speed craft traveling entirely within the atmosphere, the extreme variation in temperature and pressure, being imposed immediately upon initial atmospheric re-entry, results in such great relative expansion of the skin with respect to its support as to cause great distortion, buckling, and possible mal-function. On the other hand, the structural requirements of the missile demand that the outer skin be uniformly supported by the inner structure to continuously withstand the extreme pressure loading without being distorted in shape or collapsing.

In accordance with the present invention, there is provided a missile nose structure incorporating a unique means for coupling these inner and outer members in such a manner as to enable the necessary changes in dimension as occasioned by the extreme changes in heat and pressure, while providing substantially uniform and sufficient support for the outer skin structure both before and after atmospheric re-entry. In other words, there is provided a unique means for fastening the outer skin to an inner support under conditions where the outer skin may be substantially instantaneously varied from a cold condition to one of extreme heat and pressure with no appreciable variation in the temperature of the inner support.

It is accordingly one object of the present invention to provide a means for supporting a thin sheet that is rapidly changeable from a cold condition and low pressure to an extremely hot condition and high pressure without collapse or distortion on the sheet or portions thereof during such rapid changes.

Figure 1:
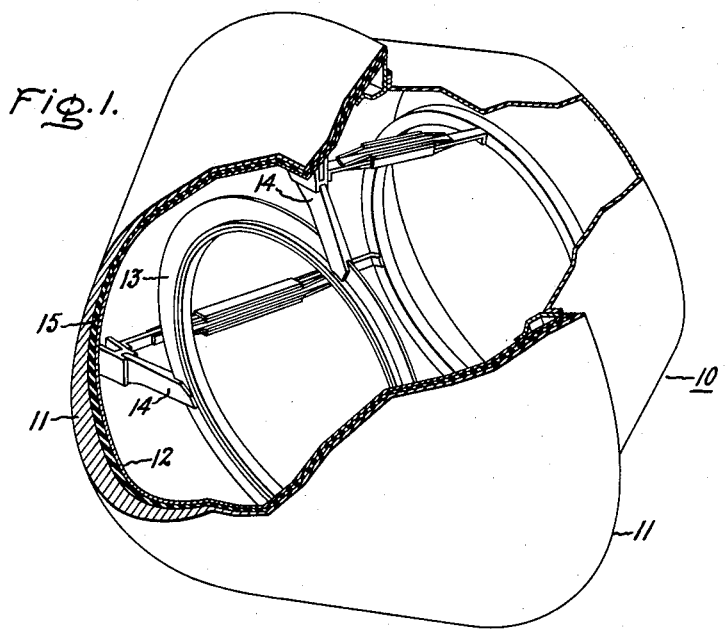
Figures 2, 3:
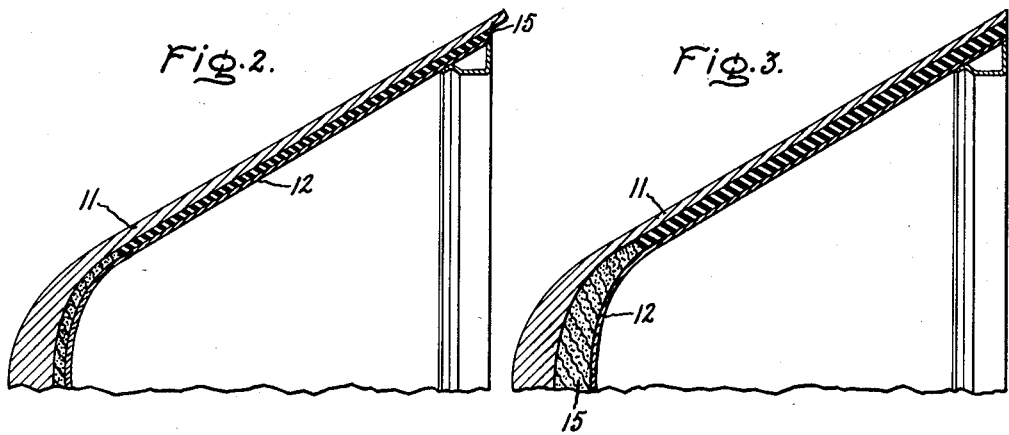

Other objects and many attendant advantages will be more readily comprehended by those skilled in the art upon a detailed consideration of the following specification taken with the accompanying drawings wherein:

Fig. 1 is a perspective view, partially in section, illustrating one preferred embodiment of the present invention, and Figs. 2 and 3 are side sectional views schematically depicting the operation of this structure as the skin temperature and pressure changes from a condition of cold and low pressure to one of great pressure and extreme heat.

Referring now to Fig. 1 for a detailed consideration of one preferred embodiment of the invention, there is shown the forward end or nose portion of a vehicle, such as a missile 10, having an outer shield or skin 11 of substantially conical shape supported upon an inner liner 12 also substantially conically shaped. The liner or support 12 is strengthened with suitable bracing means, preferably comprising one or more structural reinforcing rings 13 or the like concentrically mounted inside of the liner 12 and supporting the liner by means of a series of radially extending arms 14 and side braces, as shown, spaced about the rings and connecting with the inside of the liner 12.

Outer skin 11 is preferably formed of relatively thin material having sufficient thermal conductivity to enable heat to be conducted uniformly throughout, but may be made thicker at the forward nose portion, as shown, or in other regions, to compensate for more rapid heating of the skin at those portions. The inner liner 12 and structural supports 13 and 14 are preferably selected of a material having high strength and low relative weight, such as aluminum alloy or steel, since this liner structure serves primarily as a support and is thermally insulated from the skin as shall be more fully discussed hereinafter.

In accordance with the present invention, there is additionally provided a resilient cushion 15 positioned intermediate the outer skin 11 and the support liner 12, and, in effect, sandwiched between these members. This resilient cushion is preferably selected of a suitable rubber-like material, such as neoprene, or the like, adjacent to the support 12 and upper layer of insulation, such as the suitable fibre (not shown), positioned adjacent to skin 11 to thermally insulate the outer skin 11 from its liner 12 thereby serving to provide a resilient cushion therebetween to absorb shock and vibration. The resilient cushion material 15 may be omitted or made of softer material near the forward nose portion to permit greater compression in this area, if desired.

During the initial re-entry of the body into the earth's atmosphere from outer space, the great heat being imposed upon the body results in considerable expansion of skin 11. If skin 11 is rigidly attached to an under structure that is not correspondingly heated and expanded, severe stresses, warping, and buckling of the skin takes place. By means of the resilient cushion 15, however, the skin freely expands without such stresses being imposed. Simultaneously, with this thermally caused expansion, considerable pressure is exerted upon the body during atmospheric re-entry providing a force upon the nose acting to decelerate the travel of the body; and this decelerating force is transmitted from the skin through the resilient cushion 15 to the inner support liner 12. Because of the resiliency of cushion 15, the forward inertia of the liner causes this inner structure to slide forward into the skin, more tightly sandwiching the outer skin and inner structure together and compressing or deforming the cushion 15 as shown in Fig. 2. In sliding forward into the skin, the inner structure exerts a wedging action upon the expanding skin through the medium of the compressed cushion 15, thus causing the wall of the skin to develop hoop tension and thereby preventing buckling and vibrational flutter.

Fig. 2 schematically illustrates this deformation of the cushion 15 resulting from the combined heating and pressure applied to the skin and clearly depicts the manner by which the inner support liner 12 slides further into skin 11 to provide greater support and strength.

Fig. 3 illustrates the normal mating position of the skin and liner before atmospheric re-entry and prior to the time that the liner slides forward into the skin as shown in Fig. 2.

Thus it is observed that the combined action of heating the outer skin and subjecting the outer skin to great pressure are both corrected in such a manner as to enable the free expansion of the outer skin while providing a uniform support of this outer skin.

In accordance with the present invention, the outer skin and inner liner are both preferably conically shaped as shown, since a cone, in expanding, does not appreciably change in conical angle. Consequently, forming the skin and liner in a conical shape enables the liner to slide uniformly into the skin and thereby provides substantially complete support to the skin over a wide range of temperatures and pressures applied thereto. Minor deviations in shape from a true cone or minor variations in temperature along the surface of the skin provide but little additional stresses and consequently do not appreciably affect the operation of the structure. However, it is preferred that the semi-vertex angle of the conical portion not exceed 70° or be less than 5° since the larger angled cones, beyond the upper limit, fail to provide adequate lateral support and the smaller angle cones, beyond the lower limit, enable the liner 12 to slide forward into the skin by an excessive amount.

Although but one preferred embodiment of the invention has been illustrated and described, it is believed evident that those skilled in the art may make many changes without departing from the spirit and scope of the invention. Accordingly, this invention is to be considered as being limited only by the following claims appended hereto.

What is claimed is:

1. Means for rigidly supporting an aircraft skin member of conical-spherical configuration both before and after its transition from an ambient temperature environment to an environment of extremely high temperature and pressure and preventing change in this configuration despite forces tending to buckle and flutter the skin, said means including a support frame structure positionable within the skin and providing hoop support thereto, and means enabling said frame to slide further into said skin upon thermal expansion of the skin, said means including a deformable cushion material separating said skin and support, whereby upon expansion of said skin with heat, said support continues to provide hoop support thereby preventing buckling, flutter, and destruction of the skin.

2. Means for maintaining the symmetry and configuration of a conical-spherical shaped member constant at both ambient temperature and extremely elevated temperature comprising: an aircraft outer skin member of symmetrical conical-spherical configuration about a given axis, a rigid support frame member positioned within said skin and providing reinforced hoop support thereto transverse to said axis, and means enabling said rigid support to move into said outer skin along said axis as said skin uniformly expands with temperature, thereby maintaining said hoop support, said means including a deformable cushion material interposed between said frame and skin.

3. An aircraft nose construction adapted to withstand extreme variations in temperature and pressure without collapse, flutter, or buckling comprising: a substantially hollow and relatively lightweight support member having a generally spherical-conical shaped outer surface, said support member being fabricated of thin metal and being provided with inner bracing members to supply rigidity and strength, a substantially conically shaped outer skin member adapted to mate thereover, said skin member being formed of a material having a high thermal conductivity and having a relatively thin cross-sectional thickness in relation to the radius of the base of said cone, whereby said mated support and skin form a substantially hollow fabricated nose cone construction, and a readily deformable cushion material sandwiched between said mated members, said cushion being of thermally nonconductive material and substantially completely separating said members to provide both a shock absorbing medium therebetween as well as a thermal insulator.

References Cited in the file of this patent

UNITED STATES PATENTS

| 620,387 | Wang | Feb. 28, 1899 |
| 1,435,773 | Wilhelmi | Nov. 15, 1922 |
| 2,405,001 | Whittaker | July 30, 1946 |
| 2,482,132 | Studler | Sept. 20, 1949 |
| 2,602,408 | Smith-Johannsen | July 8, 1952 |

FOREIGN PATENTS

| 115,476 | Great Britain | May 8, 1918 |